March 10, 1964     R. F. AUSTIN, JR     3,123,932
FISHING LURE
Filed March 16, 1962
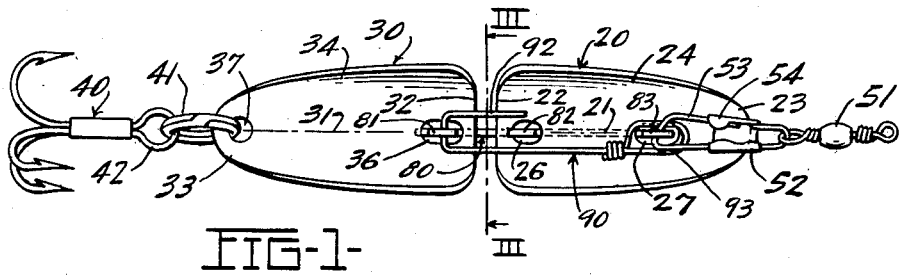
FIG-1-
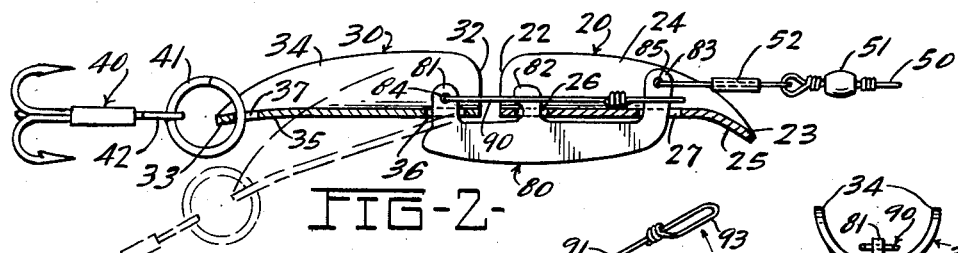
FIG-2-
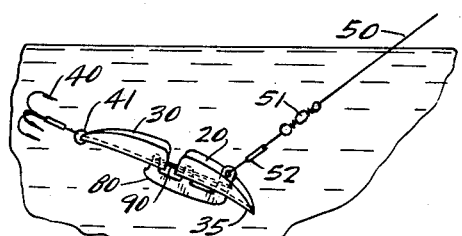
FIG-5-
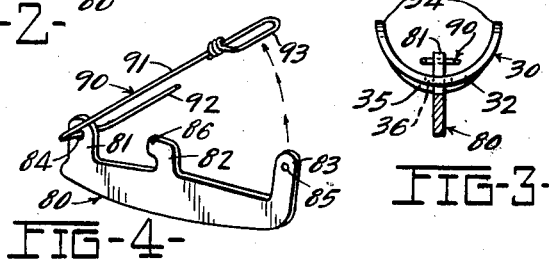
FIG-4-  FIG-3-
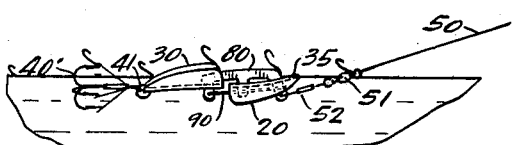
FIG-6-
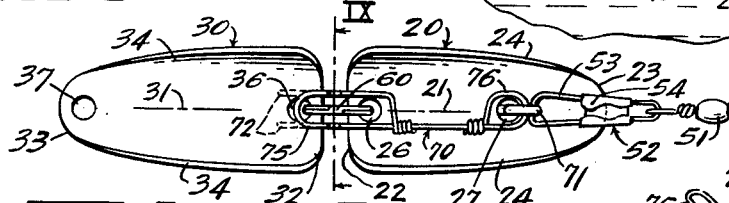
FIG-7-
FIG-10-
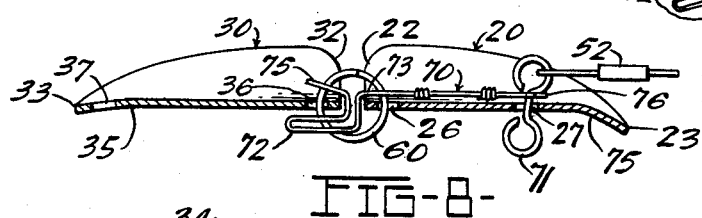
FIG-8-
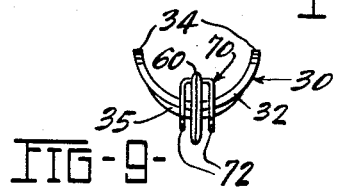
FIG-9-
INVENTOR:
ROBERT F. AUSTIN, JR.
BY
            ATT'Y.

United States Patent Office 3,123,932
Patented Mar. 10, 1964

3,123,932
FISHING LURE
Robert F. Austin, Jr., 3029 Sherbrooke Road,
Toledo, Ohio
Filed Mar. 16, 1962, Ser. No. 180,096
13 Claims. (Cl. 43—42.09)

This invention relates to fishing lures and more particularly to a fishing lure having a pair of relatively interchangeable spoonlike elements whereby different arrangements may be had to provide a lure of correspondingly varying action when being drawn through the water while fishing.

This application is a continuation-in-part of Robert F. Austin, Jr. copending application Serial No. 725,118, filed March 31, 1958 and now abandoned.

Heretofore lures of this category have included spoonlike elements which were formed in a manner to impart directional influence on the lure and it has been a problem in the past to regulate or control the movements or action of the lure satisfactorily without having a more or less complicated construction, costly forming equipment, or cumbersome parts.

It is an object of this invention to produce an efficient, simple, effective, economic, attractive and easily assembled and operated interchangeable fishing lure.

Another object is to provide a lure adaptable either to deep trolling or shallow or surface trolling.

Another object is to provide a casting lure which may be used for shore line fishing, fishing over rocky ledges, or fishing in shallows around deep holes.

Another object is to provide a lure having a plurality of different luring actions by reason of interchangeability of its parts.

Another object is to provide a casting lure composed of a pair of loosely linked spoon pieces which will not foul or snag with each other or the line during casting or fishing.

Still another object is to provide such a lure which includes a directing fin which improves the stability of the lure in the water and maintains it in an upright position.

In general this invention comprises a pair of spoon pieces of substantial saddle-shaped configuration linked together in line, the rearward one of which spoon pieces has a hook connected to it and the forward one of which is connected to a fishing line by means of a releasable snap, and preferably also a swivel, and a bar means releasably connected between said link and snap for restricting the relative movement between the spoon pieces so as to prevent their fouling with each other or the line. In one embodiment of this improved invention this bar means may also comprise a fin for stabilizing the lure as it is drawn through the water. The releasability of the connection of the snap and bar means permits one of the spoon pieces to be easily inverted with respect to the other, to change the lure from a deep running lure to a shallow or surface lure, the shallowness depending upon the speed with which the inverted spoons are dragged through the water, the faster the speed the closer this lure rises to the surface.

Each of the two spoon pieces comprises a smooth continuously curved blunt end ovate element bent into a substantial saddle shape with two longitudinally spaced apertures one of which is at its blunter end, which blunter ends are preferably connected adjacent each other by said link. The rearward spoon piece has its second aperture at its far rounder end, while the forward spoon has its aperture spaced between about one sixth and one third the distance inwardly from its rounder end. Furthermore the rounder end of the forward spoon piece may be provided with a greater reverse curvature along the axis than that of the rearward piece, particularly toward the rounder end beyond the inwardly spaced second aperture therein.

The link means connecting the two spoon pieces may comprise either a split ring or a fin shaped member having projections which extend into the two adjacent blunt end apertures, and may also extend forward into the other or second aperture in the forward spoon piece to provide a connection for the snap means.

The releasable bar means connected between the link means and the snap means, in the case of the ring link comprises a plurality of guiding projections which fit on each side of the ring link and above and below the edge of the rearward spoon piece to restrict its motion while in the case of the fin member it is attached to its projections. In both cases the bar means extends longitudinally of the forward spoon piece from the link means to the connection for the snap means, and is held in place by said snap means. Thus the link means and bar means cooperate to restrict the relative movement between the two spoon pieces.

The above mentioned and other features and objects of this invention and the manner of attaining them will become more apparent and the invention itself will be understood best by reference to the following description of embodiments of the invention taken in conjunction with the accompanying drawing, wherein:

FIG. 1 is a plan view of a double spoon fish lure in its deep running assembled position according to one embodiment of this invention;

FIG. 2 is a cross-sectional view taken along the longitudinal center line of FIG. 1, with one of the limits of relative movement of the rearward spoon piece with respect to that of the forward spoon piece being shown in dotted lines;

FIG. 3 is a cross-sectional view taken along line III—III of FIG. 1 facing the blunt end of the rearward spoon piece;

FIG. 4 is a perspective view of the fin type link and bar means employed in connection with spoon pieces of FIGS. 1 and 2;

FIG. 5 illustrates the lure of FIGS. 1 and 2 used in deep running or trolling;

FIG. 6 illustrates the lure of FIGS. 1 and 2 with the forward spoon inverted relative to the rearward spoon when used in surface or shallow trolling or fishing;

FIG. 7 is a plan view of a double spoon piece fish lure similar to that shown in FIGS. 1 and 2, but employing another embodiment of link and bar means between the two spoon pieces;

FIG. 8 is a longitudinal sectional view of the lure shown in FIG. 7;

FIG. 9 is a sectional view taken along line IX—IX of FIG. 7; and

FIG. 10 is a perspective view of the bar means employed in FIGS. 7 and 8 for restricting the relative movement between the spoon pieces thereof.

Referring now to the drawings the forward and rearward spoon pieces 20 and 30, respectively, are the same in both the embodiments shown herein in FIGS. 1, 2, 7 and 8. Each of the pieces 20 and 30 is of a substantially ovate form having a longitudinal axis 21 31, a blunt or blunter end 22 and 32, and a sharper or rounder end 23 and 33, and upturned side portions 24 and 34, respectively, to form a generally U-shaped transverse cross-section as seen in FIGS. 3 and 9. For about one fourth of the length of each spoon 20 and 30 from its sharper end 23 and 33, each spoon is bent along it longitudinal axis 21 and 31 in the opposite direction from its portions 24 and 34 to form reverse bend portions 25 and 35, respectively. The portion 25 of the forward spoon piece 20 may have a slightly greater bend or curvature than that of the rear spoon piece 30. The bent portions 24, 34, 25 and 35 form a type of saddle shaped spoon which shape augments or enhances the diving, wiggling and other odd or irregular movements of the lure when it is pulled through the water, and the bent end 25 of the forward spoon piece 20 aids in the diving of the spoon piece when employed in the position shown in FIG. 5, and correspondingly in rising the lure in the shallow or surface operation when employed in the position shown in FIG. 6.

Each of the spoon pieces is provided with a pair of apertures one of which apertures 26 and 36 is located in the blunt end of each spoon piece 20 and 30, respectively, and may be either oblong or round as shown respectively in FIGS. 1 and 7, as desired. In other aperture 37 in the rearward spoon piece is located adjacent the rounder end 33, and to it may be connected the hook 40 which is herein shown to be a symmetrical multiprong hook releasably connected by means of a split ring 41 which extends through the aperture 37 and also through the eye 42 at the end of the hook 40. Other hooks than the particular type shown may be connected to this aperture without departing from the scope of this invention, including, for example, the anti-snag type hook 40' shown in FIG. 6. The other aperture 27 in the forward spoon piece 20 also may be either oblong or circular as shown in FIGS. 1 and 7, respectively, but is spaced between about one sixth and one third the length of the spoon piece inwardly from the rounded or sharper end 23. It is to a connecting means which extends through this aperture 27 that the fish line 50 for pulling the lure is attached, preferably through a swivel 51, and always by means of a removable or releasable snap connector 52 as shown in FIGS. 1, 2, 7 and 8. This snap connector 52 may be provided with a spring hook releasably engaging a latch 54, as is employed in a safety-pin (see FIG. 1). The releasable snap means or connector 52 permits the easy connection and dis-connection of the lure of this invention to a line, as well as the easy disassembling of the lure for the inversion of one of the spoon pieces with respect to the other, namely the rearward spoon piece 30 from the position shown in FIGS. 1, 2, 3, 5, 7, 8 and 9 to the relative inverted position shown in FIG. 6.

In creating the varying motions and degrees of wiggle and dart in the water and in controlling at least in part some of the directions of movements which may ensue, there is provided a loose connector or link between the two spoon pieces 20 and 30 which may take the form of a split ring 60 as shown in the embodiment of FIGS. 7, 8 and 9 corresponding with the disclosure in the above mentioned copending application of which this is a continuation-in-part, or it may take the form of a metal strip or fin member 80 as shown in FIGS. 1, 2, 3 and 4 which will be described later.

If the simple split ring link 60, similar to the ring 41, is employed, it has been found that the lure of this invention is materially improved by the restriction of the relative movement between the spoon pieces 20 and 30 by means of a bar means 70 (see FIG. 10) which may be made from bent wire and which brackets the link means 60 and the blunt end of the rearward spoon piece 30 at one end and is connected at its other end to a connecting member 71 which extends through the aperture 27 to one loop or eye of which snap means 52 is connected. This bar means 70 comprises a pair of offset projections 72 from a pair of branch members 73 from the central bar 74, which are spaced either side of the link ring 60 and permit a limited degree of relative sideways movement between the spoon pieces 20 and 30. The limit of this movement is when the ring 60 contacts the side members 72 and 73 and/or the ends 22 and 32 of the spoon pieces abut against themselves. The offset projections 72 extend under or on one side of the spoon piece 30 adjacent its aperture 36 and also include an over or an upwardly extending and overhanging loop connecting portion 75 spaced from the extensions 72, which limits the up and down or vertical relative movement of the spoon piece 30 with respect to the bar member 70 and correspondingly with the spoon piece 20. This bar member 70 is anchored substantially along and parallel to the center line 21 of spoon piece 20 by means of its loop 76 at its opposite or forward end which loop 76 slips over the connecting means 71 and is held in position thereon by the releasable snap means 52. Thus in assembling this embodiment of the lure, the bar means 70 is first placed with its extension 72 in between the two spoon pieces 20 and 30 and on either side of the link ring 60 to project underneath the spoon piece 30 and then is laid down over the top of spoon piece 20 parallel to its center line 21 with the loop 76 over the connecting member 71 as shown in FIG. 8, and then the snap ring 52 is connected to the member 71 to maintain the bar means 70 in the position shown in FIGS. 7 and 8.

Referring now to the other embodiment of the link means 80, and its bar means 90 shown in FIGS. 1 through 6; the link 80 comprises a fin type plate provided with a plurality of upwardly extending projections 81, 82 and 83, which are so spaced to project through the apertures 36, 26, and 27, respectively, in spoon pieces 30 and 20. The projections 81 and 83 are each provided with a hole 84 and 85, respectively, while the intermediate projection 82 is provided with a hook or overhang shoulder 86 to hold the fin against the spoon piece 20. The holes 84 and 85 are for attachment of the bar means 90 and line snap 52, respectively, thus anchoring the fin link 80 and bar means 90 to the spoon pieces 20 and 30. The link 80 is provided with a lower depending fin substantially parallel to the center lines 21 and 31 of the two spoon pieces 20 and 30, which fin aids in directing and maintaining the lure in an upright position as shown in FIGS. 1, 2, 5 and 6 and also increase the ease with which the parts of the lure may be assembled and disassembled including the inversion of the spoon piece 20. Furthermore, this link fin 80 aids the bar means 90 in restricting the relative movement between the spoon pieces 20 and 30. The two projections 82 and 83 which extend through the forward spoon piece 20 relatively fix the movement of the link fin means 80 with respect to the spoon piece 20, so that the spoon piece 30 only moves relatively to the fin link 80 on the projection 81 an amount depending upon the clearance provided in the aperture 36 for the projection 81.

The bar means 90, which may be made of bent wire, has its bar portion or shank 91 along and parallel to the center line 21 of spoon piece 20, and is connected to and between the projection 81 and 83. A hook portion 92 at one end of the bar means 90 is thread through the hole 84 in projection 81 and extends sufficiently to bracket the projection 82 as shown in FIGS. 1 and 4. The opposite end of the bar means 91 is provided with an eye portion 93, similar to the portion 76 of bar means 70 shown in FIG. 10, which fits over the connecting means or projection 83 and is maintained in that position by the snap hook 52 which extends through the hole 85 as shown in FIGS. 1 and 2. Thus, by removal of the snap 52 not only can the lure be removed from the line 50 but also may be disassembled for removal of the eye 93 into the position shown in FIG. 4, the release of the hook 92 from the hole 84 so that the spoon piece 30 may be inverted relative to the spoon piece 20, and then the hook reassembled for easily changing the lure from a deep running to a surface type lure as shown in FIG. 6 as distinguished from FIG. 5, or vice versa.

The parts of this lure may be treated in different ways to enhance appearance, durability, strength and fish catching characteristics. The parts may be made of metal, preferably non-corrosive, or plated or enameled, die cast, anodized aluminum, or of a molded plastic, or the like. The link means 60 and bar means 70 and 90 may be made of wire, while the link fin means 80 may be also made of the same or similar type of material as the spoon pieces. A great variety of colors are obtainable in the finishing of the lures of this type, and uncolored and unprotected parts may be brass, Monel, stainless steel or other treated or untreated materials. Thus certain parts of one material and/or color may be interchanged with like parts of another color and/or colors to produce a large variety of different lures from only a relatively few different types and/or colors of elements or spoon pieces.

Although only two embodiments and two interchanges of the parts have been described above and illustrated, this invention is by no means limited to these particular embodiments in that the spoon pieces may be reversed in their connections as well as inverted relative to each other, and the hook means may be interchanged with the line connecting means, similarly to the disclosures in the above mentioned copending application.

While there is described above the principles of this invention in connection with specific apparatus, it is to be clearly understood that this description is made only by way of example and not as a limitation of the scope of this invention.

What is claimed is:

1. A combination spoon type lure comprising:
   (A) a forward and rearward spoon piece, each comprising:
      (a) a substantial saddle shape, and
      (b) a blunter and a rounder end with a pair of apertures aligned longitudinally thereof with one at each blunter end,
   (B) a link means connecting said pieces together for relative movement through said apertures in said blunter end,
   (C) a hook means received in the other aperture in said rearward spoon piece,
   (D) a snap fastener means for releasably connecting a line to the other aperture in said forward spoon piece, and
   (E) a bar means extending between and retained by said link means and said snap means for restricting the relative movement of said spoon pieces about said link means.

2. A lure according to claim 1 wherein the longitudinal curvature of said forward spoon piece has more curvature than said rearward spoon piece.

3. A lure according to claim 1 wherein said link means comprises a split ring.

4. A lure according to claim 1 wherein said link means comprises a depending fin means having projections extending through said apertures in said blunter ends.

5. A lure according to claim 4 wherein said fin means includes an additional projection extending through said other aperture in said forward spoon piece.

6. A lure according to claim 1 including a swivel between said snap means and said line.

7. A lure according to claim 1 wherein said bar means extends longitudinally of said forward spoon piece between said apertures therein, and includes offset portions for restricting the relative movement between said spoon pieces.

8. A lure according to claim 1 wherein said link means comprises a ring, and said bar means comprises four transverse projections for bracketing said link means and the end of said rearward spoon piece for limiting the relative movement of said rearward spoon piece on said ring link means with respect to said bar means.

9. A lure means according to claim 8 wherein said bar means includes means for restricting the movement of said ring relative to said forward spoon piece.

10. A lure according to claim 1 wherein said link means includes a fin member having projections extending through said blunter end apertures, and said bar means bridges said projections for connecting said rearward spoon piece to said fin member and for limiting the relative movement of said rearward spoon piece to that of said forward spoon piece.

11. A fish lure for deep running and surface fishing comprising: a pair of saddle shaped spoon pieces, each piece being blunter at one end than the other and having a U-shaped transverse cross-section and a shallower reversely curved longitudinal cross-section, and each piece having two apertures therein, one piece having an aperture at each end thereof with the other piece having one aperture at its blunter end thereof and its other aperture spaced inwardly at least one sixth the length thereof from its outer end, a loosely fitting removable coupling for connecting said spoon pieces together and fitting in the blunter end apertures of each spoon piece whereby the U-shaped transverse cross-section of said one piece may be reversed with respect to the U-shaped transverse cross-section of the other piece, a hook means attached by a loose coupling to the aperture in the other end of said one piece, a removable snap for a line connected to the aperture in the other end of said other piece, and a bar means extending between said removable coupling and said snap means for restricting the relative movement about said coupling between said spoon pieces.

12. A split spoon lure for surface fishing comprising two saddle shaped elements of transverse U shape cross-section and a reverse shallower curved longitudinal cross-section, each having two holes along the longitudinal axis of each element, and each element having one blunter end than the other, one element having its two holes near its opposite ends and the other element having one hole near its blunter end and the other hole spaced at least one sixth the length of the element inwardly from its other end, a removable coupling means for loosely connecting the two blunter ends of two elements together through their adjacent holes with the U of one element being inverted with respect to the U of the other element, a hook loosely connected to the hole at the other end of said one element, a snap connection for a line attached to the other hole of said other element, and a bar means extending between said removable coupling means and said snap connection for restricting the relative movement about said coupling means between said elements.

13. A lure according to claim 12 wherein said other element has a more sharply curved longitudinal cross-section than said one element.

References Cited in the file of this patent

UNITED STATES PATENTS

| | | |
|---|---|---|
| 1,297,617 | Welles | Mar. 18, 1919 |
| 2,000,734 | Accetta | May 7, 1935 |
| 2,032,819 | Tengel | Mar. 3, 1936 |
| 2,817,921 | Czesnocha | Dec. 31, 1957 |
| 2,819,554 | Neale | Jan. 14, 1958 |